United States Patent [19]

Belloli

[11] 4,436,479

[45] Mar. 13, 1984

[54] METHOD AND MEANS FOR ORIENTING BEVEL TIPPED NEEDLES AND THE LIKE

[75] Inventor: Archille Belloli, Milan, Italy

[73] Assignee: Joule' Technical Corporation, Union, N.J.

[21] Appl. No.: 408,466

[22] Filed: Aug. 16, 1982

[51] Int. Cl.³ .................................... B65G 47/24
[52] U.S. Cl. .............................. 414/757; 29/467; 29/468; 29/DIG. 46; 198/394; 414/754; 414/770; 414/780; 414/786; 604/272
[58] Field of Search ............ 414/745, 754, 757, 758, 414/768, 770, 780, 781, 784, 786, 787; 29/464, 467, 468, DIG. 46; 198/394; 604/272; 209/538; 193/2 B

[56] References Cited

U.S. PATENT DOCUMENTS

| | | | |
|---|---|---|---|
| 2,896,379 | 7/1959 | Herrmann | 414/745 X |
| 3,631,990 | 1/1972 | Redmer | 414/754 |
| 3,662,457 | 5/1972 | Gores | 29/DIG. 46 |
| 3,880,074 | 4/1975 | Seifert | 198/394 X |
| 3,881,605 | 5/1975 | Grossman | 414/754 X |
| 4,091,726 | 5/1978 | Walker | 198/394 X |

Primary Examiner—Leslie J. Paperner
Attorney, Agent, or Firm—Holland, Armstrong, Wilkie & Previto

[57] ABSTRACT

A device is described for orienting intravenous needles or other similar articles having relatively long shank portions which terminates in bevelled or flat tips. The device has a fixture for supporting the needles at an angle to the horizontal and with the bevelled tip resting on a knife edge. A vibrator is coupled to the needle supporting fixture causing the needle to turn to its most stable position on the knife edge where the flat portion engages the knife edge.

8 Claims, 7 Drawing Figures

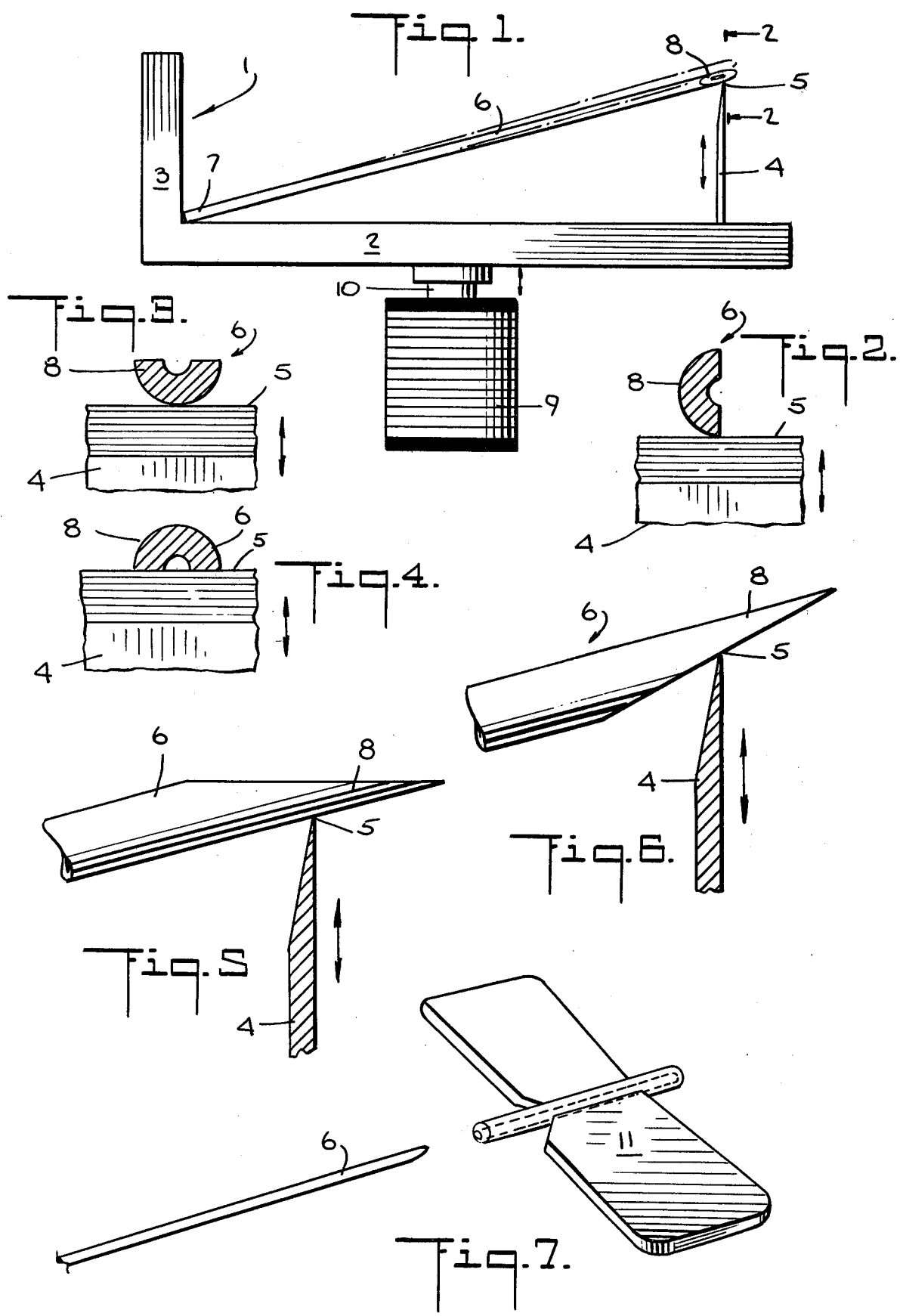

METHOD AND MEANS FOR ORIENTING BEVEL TIPPED NEEDLES AND THE LIKE

BACKGROUND OF THE INVENTION

The present invention relates to the orientation of intravenous needles or similar articles during their manufacture and provides an automatic means for causing all needles to have the same orientation with respect to the position of the flat portion of the bevelled needle tip. More particularly, the invention relates to a vibrator fixture which automatically orients such needles as a step during their handling such as prior to the insertion of the needle into a butterfly syringe or other intravenous carrier.

The present practice during the manufacture and handling of intravenous needles and similar items, having small flat portions which must be oriented, is to manually ascertain the position of the flats and to then manually manipulate the needles to provide a specific orientation. The method and means of the present invention eliminates the need for such a manual observation and orientation and automatically moves each needle to a predetermined position. This provides a simple and high speed orientation step and also provides a method and means which are readily incorporated into partial or fully automated needle instrument manufacturing lines.

Accordingly, an object of the present invention is to provide an improved method and means for orienting intravenous needles or similar articles having elongated shanks with bevelled tips.

Another object of the present invention is to provide an automatic needle orienting device.

Another object of the present invention is to provide an improved vibratory method and means for orienting bevel tipped needles.

Other and further objects of the present invention will become apparent upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is a side elevational view of a preferred embodiment of the vibratory needle orientation device in accordance with the invention.

FIG. 2 is a vertical sectional view illustrating one initial position of a needle tip on the vibrating knife edge.

FIGS. 3 and 4 are vertical sectional views corresponding to FIG. 2 illustrating other positions of the needle tip relative to the knife edge.

FIGS. 5 and 6 are enlarged fragmentary side elevational views illustrating a needle tip on the vibrating knife edge.

FIG. 7 is a perspective view illustrating a representative needle and a coded orientation indicator tag.

DESCRIPTION OF THE PREFERRED EMBODIMENT

The principle employed in the invention is the placement of the tilted needle onto a vibrating knife edge with the irregular cross section of the knife being directly in engagement with the vibrating knife edge. The inherent imbalance resulting from this positioning causes the entire needle to rotate until the contact between the knife edge and the needle reaches its most stable position which is the position where the flat surface of the needle tip engages the knife edge.

FIG. 1 illustrates a preferred device for performing this method. A fixture 1 has a base portion 2 with a needle stop 3 formed at one end and with a knife 4 mounted at the opposite end. The edge 5 of the knife 4 is on its uppermost portion and the edge 5 extends for a distance of at least several times the diameter of the needle 6 or more. The needle 6 being oriented is automatically or manually placed on the fixture 1 with one end 7 against the stop 3 and with the opposite or bevelled tip 8 on the knife edge 5. The distance between the knife edge 5 and the stop 3 is equal to about the needle 6 length minus approximately ½ the length of the bevelled tip 8 of the needle 6. This places the knife edge 5 about half way between the needle 6 end and the inner end of the bevelled tip 8.

The angle A formed between the needle and the horizontal is not critical but is preferable at least several degrees greater than the horizontal with a satisfactory angle being about 15 degrees as illustrated. Greater or lesser angles A are satisfactorily employed. The entire fixture 1 is preferably vibrated during the orienting operation. A convenient vibrator is an electromagnetic vibrator 9 whose armature 10 is physically connected to the fixture 1.

FIGS. 2 through 4 show the action of a needle 6 on the vibrating knife edge 5. For example, the needle 6 illustrated in FIGS. 2 and 3 is in an unstable position as the needle 6 is being vibrated and in each case the needle 6 tends to turn until its tip 8 becomes stabilized in the knife edge 5 in a flap position as illustrated in FIG. 4. The side view of the needle 6 in FIG. 5 corresponds to FIG. 3 and the final stabilized position illustrated in FIG. 4 corresponds to FIG. 6.

FIG. 7 illustrates a further step where each of the needles 6 in its known position on the orienting fixture 1 may then be manually or automatically carried to a further assembly position with a syringe or other carrier.

FIG. 7 shows a needle 6 held for insertion into a flat color coded tag 11 which preserves the needle orientation and which also may identify the gauge or other properties of the needle.

The above described method and means is useful for typical needles of varying sizes such as gauge sizes 27 to 18.

It is also clear from the above description that the method and means are useful for articles other than the intravenous needles of this description. The method and means, for example, may be used on any elongated article of a generally rounded cross-section where there is a flat suitable for location on a vibrating knife edge.

It will be seen that an improved method and means have been described for automatically orienting intravenous needles and similar devices. The method and means shown are effective and relatively simple and are useful for incorporation into automatic needle or other article handling systems.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. Means for orienting an elongated article with a shank portion and a flat or bevelled portion comprising the combination of a fixture with spaced stop and knife edge means, said knife edge means positioned at a level above the stop and at a distance from the stop causing it to engage the article intermediate in the ends of its flat portion, and means for vibrating said knife edge means.

2. The means as claimed in claim 1 in which said means for vibrating also vibrates said stop means.

3. The means as claimed in claim 1 in which said stop and said knife edge means comprise an article supporting fixture and said means for vibrating being operatively coupled to said fixture.

4. Means for orienting an elongated article with a bevelled tip comprising the combination of a fixture, an article stop at one end of said fixture, a knife means on said fixture spaced horizontally from said stop and having a knife edge positioned at a level above said stop, the distance between said stop and said knife edge being equal to the article length less a portion of the length of the bevelled tip, and means for vibrating said fixture.

5. A method for orienting elongated articles having shank portions and bevelled tips comprising the steps of supporting the articles between a stop and a knife edge with the knife edge engaging the bevelled tips and the stop engaging the opposite end, and vibrating the knife edge.

6. The method as claimed in claim 5 which comprises the further step of vibrating the stop.

7. The method as claimed in claim 5 which comprises the further step of attaching tags to oriented articles.

8. The method as claimed in claim 5 in which the articles are intravenous needles having bevelled tips.

* * * * *